US010280738B2

(12) United States Patent
Guo et al.

(10) Patent No.: US 10,280,738 B2
(45) Date of Patent: May 7, 2019

(54) DETERMINATION OF RADIATION TRACER DISTRIBUTION USING NATURAL GAMMA RAYS

(71) Applicant: Halliburton Energy Services, Inc., Houston, TX (US)

(72) Inventors: Qingzhen Guo, Humble, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/745,853

(22) PCT Filed: Aug. 8, 2016

(86) PCT No.: PCT/US2016/046040
§ 371 (c)(1),
(2) Date: Jan. 18, 2018

(87) PCT Pub. No.: WO2017/039968
PCT Pub. Date: Mar. 9, 2017

(65) Prior Publication Data
US 2018/0209263 A1    Jul. 26, 2018

Related U.S. Application Data

(60) Provisional application No. 62/211,121, filed on Aug. 28, 2015.

(51) Int. Cl.
*E21B 47/10* (2012.01)
*G01V 5/06* (2006.01)
*G01T 1/20* (2006.01)

(52) U.S. Cl.
CPC ............ *E21B 47/1015* (2013.01); *G01V 5/06* (2013.01); *G01T 1/2018* (2013.01)

(58) Field of Classification Search
CPC ..... E21B 47/1015; G01T 1/2018; G01V 5/06; G01V 5/00; G01V 5/04
USPC ....................................................... 250/260
See application file for complete search history.

(56) References Cited

U.S. PATENT DOCUMENTS

| 4,436,996 A | 3/1984 | Arnold et al. |
| 4,717,825 A * | 1/1988 | Smith, Jr. ................. G01T 1/40 250/256 |
| 4,883,956 A * | 11/1989 | Melcher ................ G01T 1/2002 250/269.2 |
| 5,404,010 A | 4/1995 | Anderson et al. |

(Continued)

OTHER PUBLICATIONS

International Search Report and The Written Opinion of the International Search Authority, or the Declaration, dated Nov. 30, 2016, PCT/US2016/046040, 12 pages, ISA/KR.

*Primary Examiner* — Taeho Jo
(74) *Attorney, Agent, or Firm* — Haynes and Boone, LLP (57) ABSTRACT

Various apparatus or methods are arranged to operate a tool downhole in a well, where the tool has a detection package operable to detect gamma rays. Spectra peaks of the detected gamma rays can be determined in each of selected energy windows. Distribution of radiation tracer can be determined in one or more regions around the tool from ratios of the spectra peaks. Additional apparatus, systems, and methods having a gamma ray detection package can operate in a variety of applications.

17 Claims, 6 Drawing Sheets

(56) References Cited

U.S. PATENT DOCUMENTS

| | | | |
|---|---|---|---|
| 5,459,314 A * | 10/1995 | Plasek | G01V 5/12 250/264 |
| 6,037,585 A * | 3/2000 | Gadeken | E21B 47/1015 250/260 |
| 7,075,062 B2 | 7/2006 | Chen et al. | |
| 8,511,379 B2 | 8/2013 | Spross et al. | |
| 8,996,315 B2 | 3/2015 | Guo et al. | |
| 2005/0127282 A1* | 6/2005 | Grau | G01V 5/101 250/262 |
| 2005/0199794 A1* | 9/2005 | Mickael | G01V 5/06 250/261 |
| 2007/0284518 A1 | 12/2007 | Randall | |
| 2009/0039242 A1* | 2/2009 | Botto | G01V 5/125 250/269.3 |
| 2010/0268074 A1 | 10/2010 | Van Loef et al. | |
| 2013/0214145 A1* | 8/2013 | Roscoe | G01V 5/101 250/269.3 |
| 2014/0166933 A1* | 6/2014 | Shah | G21K 4/00 252/301.4 H |
| 2014/0197324 A1* | 7/2014 | Mendez | G01V 5/101 250/395 |
| 2014/0325828 A1* | 11/2014 | Stoller | G01V 5/04 29/592.1 |
| 2015/0076335 A1* | 3/2015 | Vasilyev | G01T 1/202 250/259 |
| 2015/0129754 A1* | 5/2015 | Vasilyev | G01V 5/06 250/265 |
| 2015/0153463 A1* | 6/2015 | Shah | G01T 1/202 250/362 |
| 2015/0316678 A1* | 11/2015 | Pereira | G01V 5/12 702/8 |
| 2015/0346360 A1* | 12/2015 | Yoshikawa | C30B 29/32 250/361 R |
| 2016/0274252 A1* | 9/2016 | Moake | E21B 47/00 |
| 2016/0299251 A1* | 10/2016 | Luo | G01T 1/40 |
| 2017/0276831 A1* | 9/2017 | Galford | G01V 13/00 |

* cited by examiner

FIG. 9

DETERMINATION OF RADIATION TRACER DISTRIBUTION USING NATURAL GAMMA RAYS

PRIORITY APPLICATION

The present application is a U.S. National Stage Patent Application of International Patent Application No. PCT/US0216/046040, filed on Aug. 8, 2016, which claims the benefit of U.S. Provisional Application Ser. No. 62/211,121, filed on 28 Aug. 2015, the disclosures of which are hereby incorporated by reference in their entirety.

TECHNICAL FIELD

The present invention relates generally to apparatus and methods of making and evaluating measurements related to oil and gas exploration.

BACKGROUND

In drilling wells for oil and gas exploration, understanding the structure and properties of the associated geological formation provides information to aid such exploration. A number of different measurements in a borehole can be performed to attain this understanding. Further, the usefulness, efficiency, and accuracy of traditional measurements may be related to the precision or quality of the techniques to attain and process data derived from such measurements. Techniques and apparatus to simplify measurements, to enhance processing of measured data, to enhance analysis of data from measurements to provide properties of a formation or a borehole, or to provide combinations thereof can further aid in drilling operations.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, methods and systems can be implemented that utilizes the ratios of spectra peaks of detected gamma rays in selected energy windows to determine the distribution of radiation tracer in a borehole and a formation around the borehole. Gamma rays are electromagnetic radiation from radioactive decay of atomic nuclei. A radiation tracer is a substance that is a source of gamma rays. The gamma rays that are emitted from the borehole and the formation propagate through diverse routes and experience different radiation processes, leading to deviated spectrum shapes. The shapes of measured spectra in the tool detectors can be correlated to the radiation tracer concentrations in the borehole and the formation. Thus, radiation tracer concentrations can be determined by the analysis of the spectra shape.

Systems and methods, as taught herein, can provide a simple algorithm to determine the radiation tracer concentrations in the borehole and formation. Such systems and methods, as taught herein, can also provide in situ real time radiation tracer concentrations in the borehole and formation. No extra detector and tool design in addition to conventional spectroscopy gamma ray detection systems are required for the measurement system and operating procedure of the detection tool. Regular natural gamma ray spectra can be used with such methods to predict the radiation tracer concentrations in the borehole and formation.

Photoelectric absorption, Compton scattering, and pair production occur for gamma rays while traveling through the formation, cement, casing, borehole fluid, tools, and finally reaching one or more detectors in a tool. The radiation detection process depends on the energy of the incoming photons and materials along the route that the photons are propagating. These radiation effects suppress the observed spectrum to different degree, due to diverse routes and the materials along these routes, leading to the deviation at the peaks between the spectra.

In various embodiments, systems and method can include, but are not limited to, an apparatus with a component having a gamma ray sensor package that is able to record spectra information of incoming photons. The gamma ray sensor package can be, but is not limited to, a gamma ray scintillator coupled with a photomultiplier tube (PMT), a photodiode, or other device that converts photons to an electrical signal. The gamma ray scintillator produces scintillation lights in response to interacting with incident photons, while the PMT produces an electrical signal in response to scintillation lights or photons. The coupling of the scintillator and PMT enhances the light transmission in between them.

The gamma ray sensor package may be a semiconductor detector that produces an electrical signal in response to the deposited energy of incoming photons. This semiconductor device has the potential to reach higher energy resolution and provides more accurate spectra.

Figure 1:
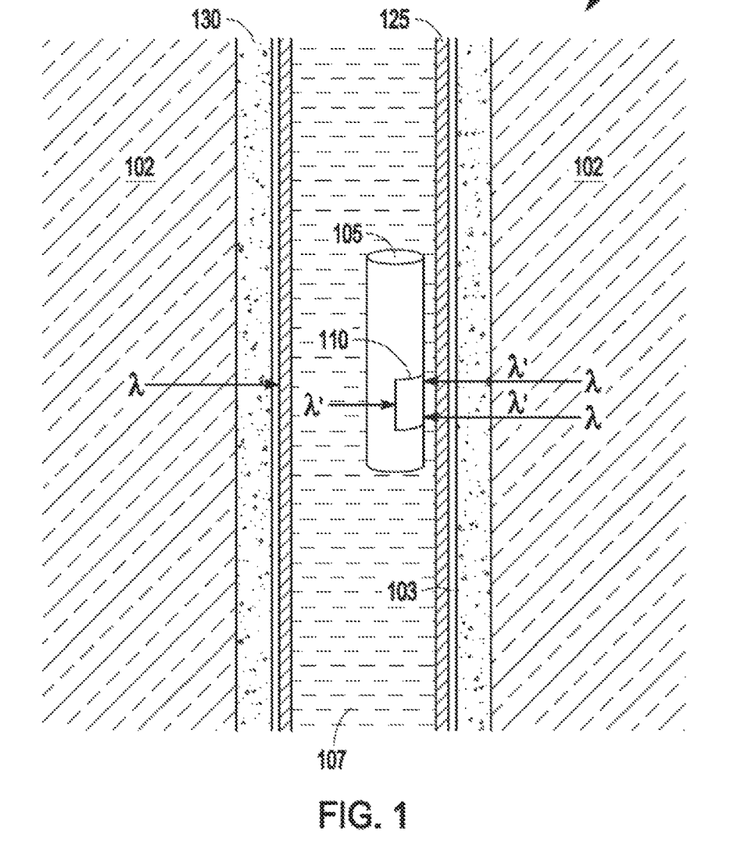
FIG. 1 is an illustration of an apparatus having a tool that can be applied in a well surrounded by borehole fluid, casing, cement and formation, in accordance with various embodiments

FIG. 1 is an illustration of an apparatus having a tool 105 that can be applied in a well surrounded by borehole fluid, casing, cement and formation, in accordance with various embodiments. Photons are emitted from the radiation tracer in the formation and in the borehole, propagate through and are attenuated by the materials between the sources and detector in the tool. It is important to know the distribution of the radiation tracer. As taught herein, methods and systems can be implemented with a simple algorithm to determine the location of the radiation tracer using natural spectral gamma ray log.

Figure 9:
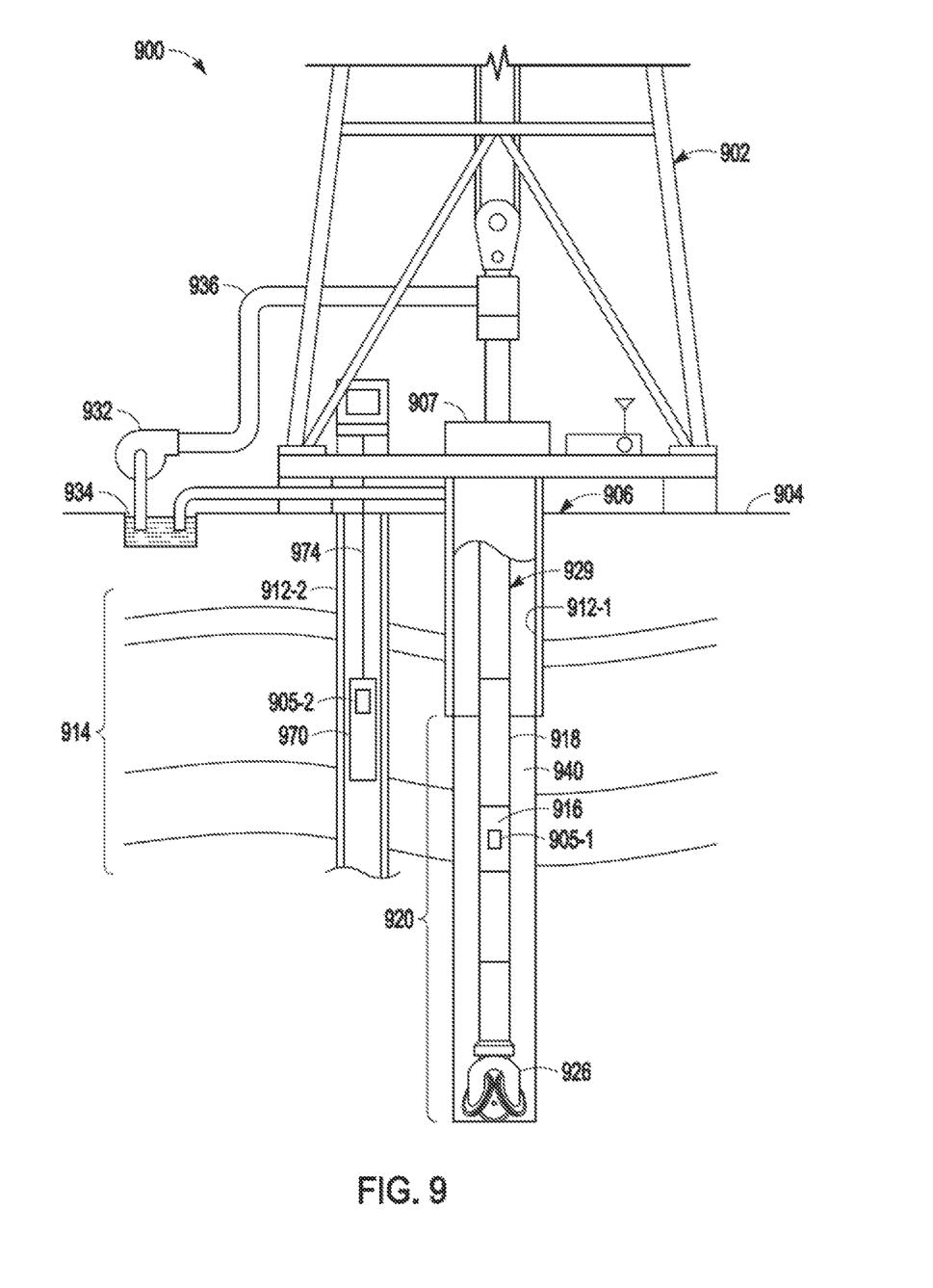
FIG. 9 is an example system at a well site, where the system is operable with a detector package, in accordance with various embodiments.

As shown in FIG. 1, the tool 105, having a gamma ray detector 110, is disposed in a borehole 106 surrounded by a formation 102. The tool 105 can be disposed in the borehole 106 by a number of different arrangements such as, but not limited to, in a wireline arrangement, a slickline arrangement, a logging-while-drilling (LWD) arrangement or other conveyance arrangement such as coiled tubing, drill pipe, downhole tractor, or the like. Examples of such conveyance mechanisms are shown in FIG. 9. The tool 105 can be disposed in the borehole 106 with one or more of a casing 125, cement 130, borehole fluid 107, and annular space 103 between the gamma ray detector 110 and sources of natural gamma rays in the formation 102 and in the borehole 106, represented in FIG. 1 by λ, where attenuation the natural gammas rays, as discussed above, is represent by λ'. Tool 105 in conjunction with a processor can be used to derive, but is not limited to, radiation tracer distribution. Such a distribution may be defined as a percent by weight of the source of the gamma radiation in the formation and/or in the borehole. The processor can be disposed on the surface, can be integrated with the tool 105, or both (e.g. via distributed or stage processing).

Gamma spectroscopy detectors typically are passive devices responsive to gamma interaction occurring in a volume of the detector. Interaction mechanisms include the photoelectric effect, the Compton effect, and pair production. For detection, the photoelectric effect is generally the interaction mechanism for which a device is generally arranged, as it absorbs all of the energy of the incident gamma ray. Full energy absorption is also possible when a series of these interaction mechanisms take place within the detector volume. A voltage pulse produced by a detector, such as a photomultiplier in a scintillation counter, can be shaped by a multichannel analyzer (MCA). The MCA is a circuit that is capable of setting up a large number of individual windows to look at a complete spectrum in one pass. The MCA can operate on a small voltage signal produced by the detector, reshape it, and convert that signal into a digital signal. In some systems, the analog-to-digital conversion is performed before the peak is reshaped. The analog-to-digital converter (ADC) can also sort the voltage pulses produced by the detector by their amplitude height, where the ADC may have a specific numbers of bins into which the pulses can be sorted. These bins can represent the channels in the spectrum of the received gamma rays. The number of channels implemented may be in range from a relatively small number of channels to a large number of channels such as from 256 channels to more than 1024 channels. For example, a MCA may consist of 1024 individual channels/windows, where a processing system can acquire data simultaneously from each window and display it as an energy spectrum. The processing system can be located downhole, at the surface, or split between the two, i.e. distributed processing. The processing system can include procedures that allow manipulation of the resultant data in a variety of ways. Such a processing system can include one or more processors and one of more memory devices. An example of an arrangement of such a processing system is shown in FIG. 2.

Figure 2:
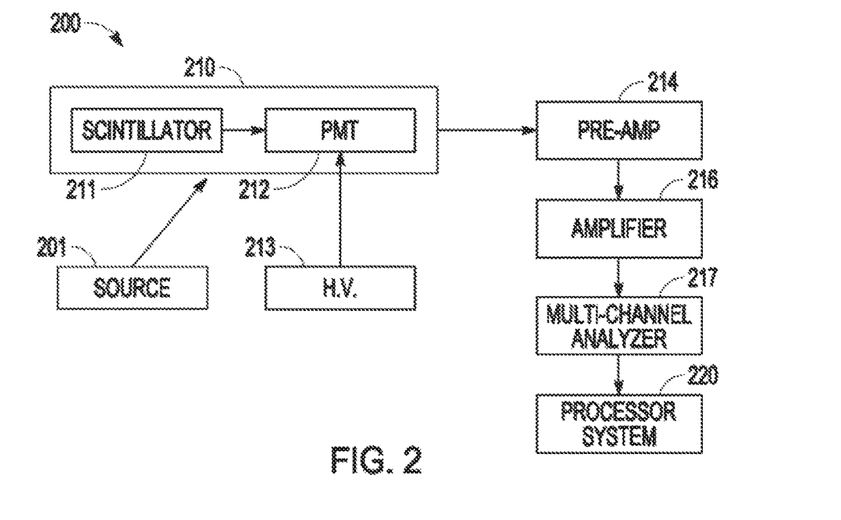
FIG. 2 is a block diagram of an example system operable to make measurements of gamma rays and process signals from the measurements, in accordance with various embodiments.

FIG. 2 is a block diagram of an embodiment of an example system 200 operable to make measurements of gamma rays and process signals from the measurements. Other systems may be used in accordance with the teachings herein. The system 200 can include a gamma ray detector 210 having a scintillator 211 coupled with a PMT 212 arranged to receive gamma ray from a source 201. The system 200 can include a high voltage source (H.V.) 213 to drive the PMT 212. The scintillator 211 may be in the form of a crystal. The gamma ray detector 210 may be realized as another arrangement of components to detect gamma rays and convert the gamma rays to an electrical signal. The gamma ray detector 210 may be arranged in a borehole as a gamma ray sensor similar or identical the arrangement of the gamma ray detector 110 of FIG. 1.

The output of gamma ray detector 210 can be provided to a pre-amp 214 that outputs a signal to an amplifier 216 in response to an electrical signal provided by the gamma ray detector 210. In response to the signal received from the pre-amp 214, the amplifier 216 provides a signal to a MCA 217, which, in response, outputs a signal to a processor system 220. The processor system 220 can process a received signal to determine various properties or characteristics from the gamma rays received by the gamma ray detector 210. The processor system 220 may include one or more processors and one or more memory devices to operate on data associated with the gamma rays received by the gamma ray detector 210.

It is important to collect the in situ real time radiation tracer distribution information, which will ensure the calculated normalized borehole gamma ray signal for each measurement as accurate as possible. The methods and systems, as taught herein, can be used to derive, but are not limited to, radiation tracer distribution.

Figure 3:
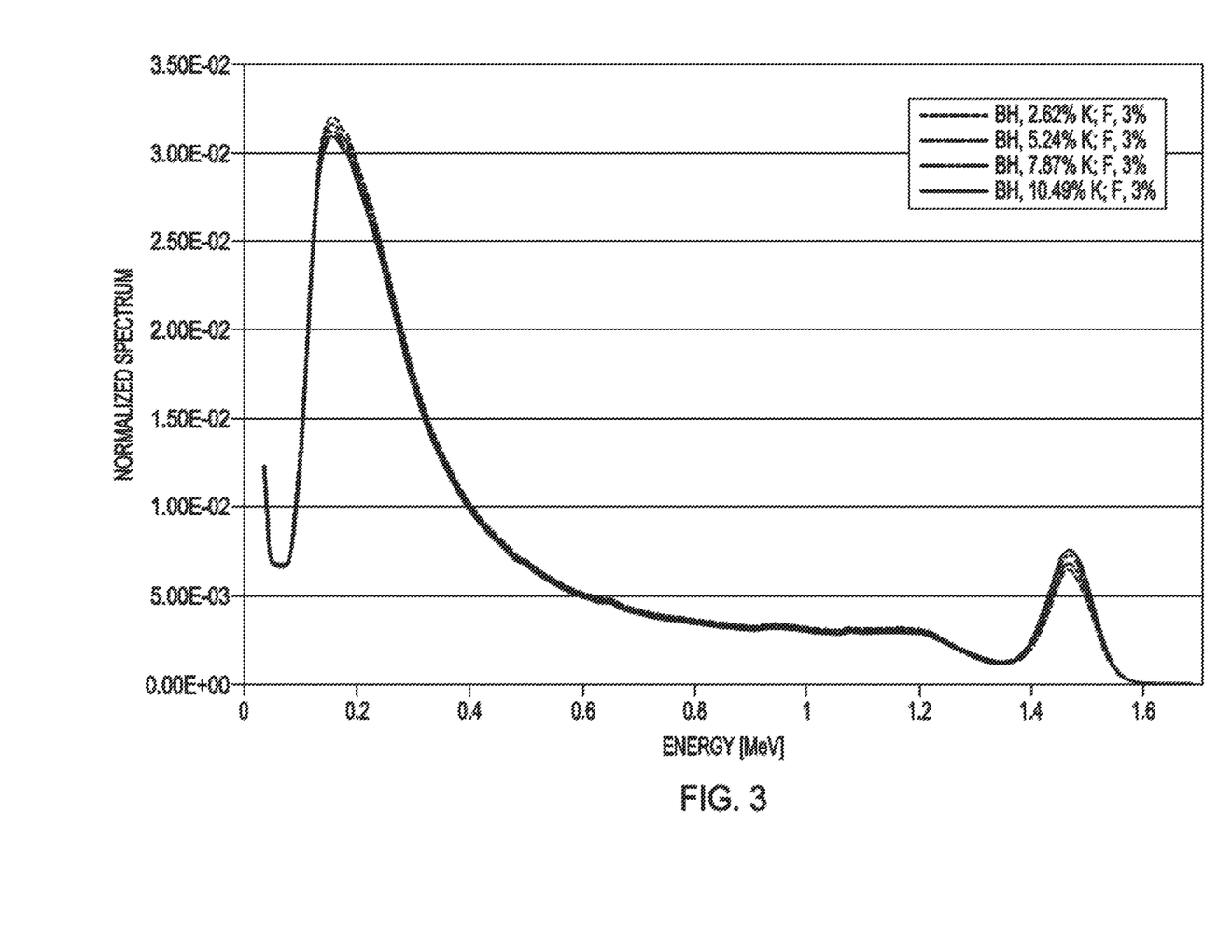
FIG. 3 is a set of plots of gamma ray spectra measured with the same formation source but increasing borehole potassium source, in accordance with various embodiments.

Potassium is used herein as an example of radiation tracer. Cases of two categories have been modeled. One model is with constant formation source, but increasing potassium source in the borehole. FIG. 3 is a set of plots of gamma ray spectra measured with the same formation source but increasing borehole potassium source: 2.62%, 5.24%, 7.87% and 10.49%. The spectra peaks are separated due to experiencing different radiation processes.

Figure 4:
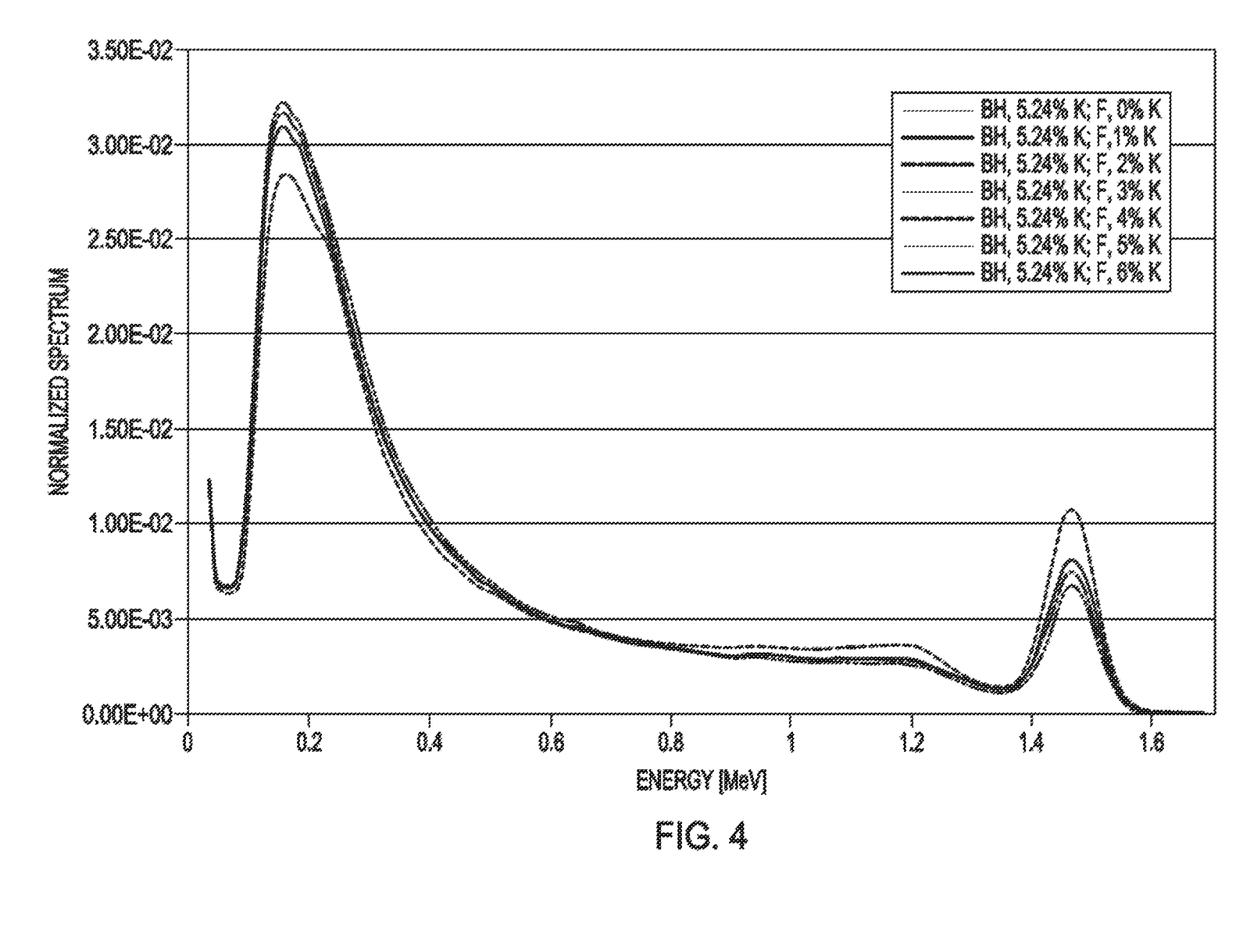
FIG. 4 is a set of plots of gamma ray spectra measured with constant borehole potassium source but increasing formation potassium source, in accordance with various embodiments.

The other model is with constant borehole potassium source, but increasing formation source. FIG. 4 is a set of plots of gamma ray spectra measured with constant 5.24% borehole potassium source but increasing formation potassium source, from 0% to 6%. The spectra peaks are separated due to different radiation processes that the photons experienced.

Two main peaks, Compton backscattering peak and photopeak, are shown in the normalized spectra in FIGS. 3 and 4. An energy window A, covering from 126.5 keV to 241.5 keV, is selected for Compton back scattering peak window. An energy window B, covering from 1.4375 to 1.495 MeV, is selected for the photopeak window. Each selected energy window can contain several energy bins (channels). The ratio of the counting rates sums in the two energy windows can be calculated in terms of $$R = \frac{C_{ComptonBSPeak}}{C_{PhotoPeak}}. \qquad (1)$$

$C_{ComptonBSPeak}$ and $C_{PhotoPeak}$ stand for the sums of normalized counting rates in Window A and B, respectively. The sum of the counting rates in each energy bin of one energy window is included in the "counting rate sum." The ratio R represents the ratio of the sums of the counting in window A and B of every spectrum, and is used as an index of the radiation tracer, as shown in FIGS. 5 and 6.

Figure 5:
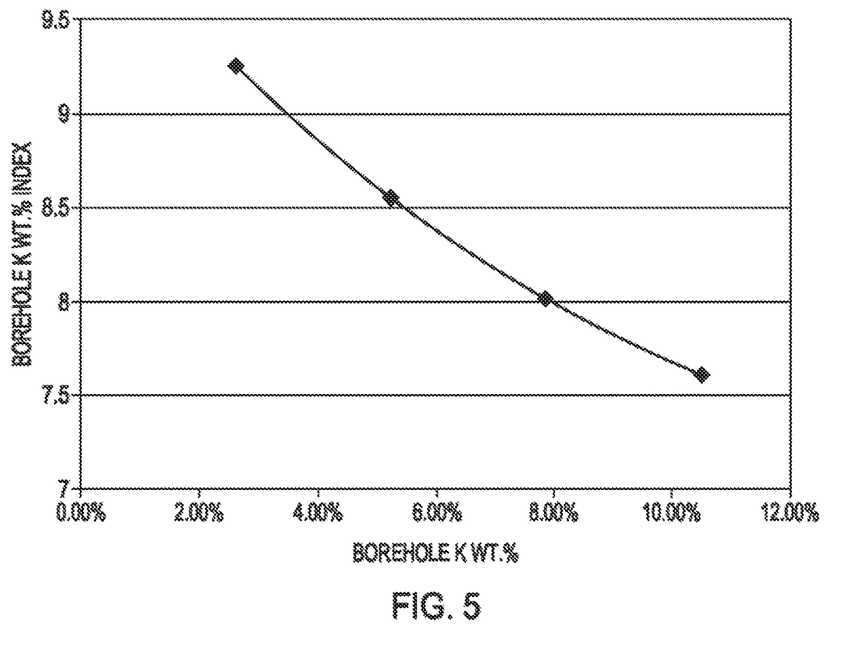
FIG. 5 is a plot of a relationship between an index and percent weight of radiation tracer in a borehole, in accordance with various embodiments.

FIG. 5 is a plot of a relationship between the index of equation (1) and the Wt. % of radiation tracer in a borehole for potassium. A spectral gamma ray measurement in the borehole can provide the index value. The radiation tracer distribution in the borehole can be deduced based on this correlation function. This relationship can be pre-engineered prior to measurement runs. The pre-engineering may be conducted by experiments or simulated to generate the relationship that is subsequently used in operational measurements. This pre-determined relationship can be stored in a memory device, such as but limited to, a database.

Figure 6:
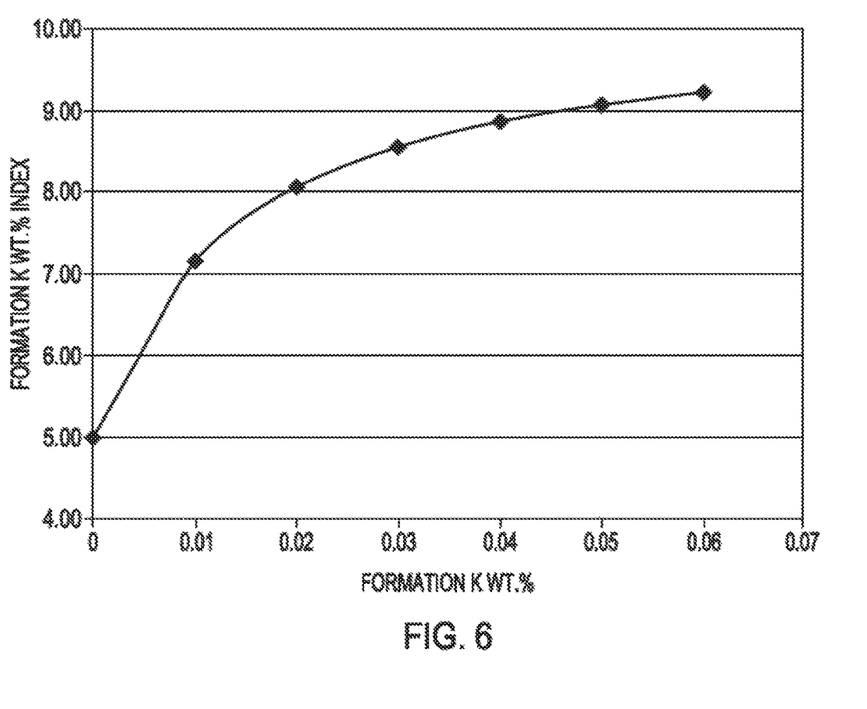
FIG. 6 is a plot of a relationship between an index and percent weight of radiation tracer in the formation, in accordance with various embodiments.

FIG. 6 is a plot of a relationship between the index of equation (1) and the Wt. % of radiation tracer in the formation for potassium. A spectral gamma ray measurement in the borehole can provide the index value. The radiation tracer distribution in the formation can be deduced based on this correlation function. This relationship can be pre-engineered prior to measurement runs. The pre-engineering may be conducted by experiments or simulated to generate the relationship that is subsequently used in operational measurements. This pre-determined relationship can be stored in a memory device, such as but limited to, a database.

The radiation tracer distribution, where the distribution is a distribution by percent weight, can be deduced based on these correlation functions. More data points with various Wt. % of radiation tracer in formation and borehole can lead to a well calibrated correlation function. As previously noted above, FIGS. 5 and 6 relate to potassium. Similar plots can be developed for materials such as uranium and sodium that may be found in a borehole or a formation.

Figure 7:
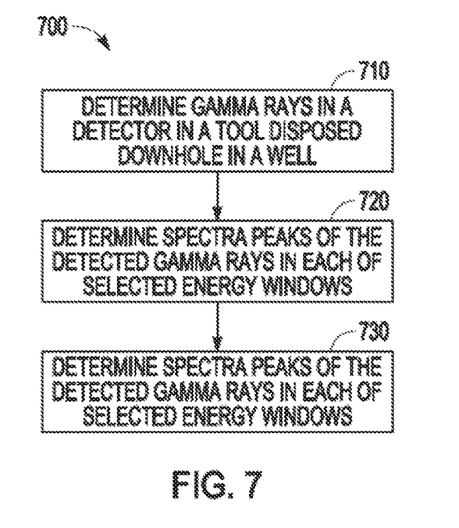
FIG. 7 is a flow diagram of features of an example method of operating a detection package to determine radiation tracer distribution using natural gamma rays, in accordance with various embodiments.

FIG. 7 is a flow diagram of features of an embodiment of an example method 700 of operating a detection package to determine radiation tracer distribution using natural gamma rays. At 710, gamma rays are detected in a detector in a tool disposed downhole in a well. At 720, spectra peaks of the detected gamma rays are determined in each of selected energy windows. Determining spectra peaks of the detected gamma rays can include determining normalized spectra peaks of the detected gamma rays. Determining spectra peaks can include determining a Compton backscattering peak in a first energy window and a photopeak in a second energy window.

At 730, distribution of radiation tracer is determined in one or more regions around the tool from ratios of the spectra peaks. The regions are between the tool and sources of the detected gamma rays. Determining distribution of radiation tracer in one or more regions can include determining the distribution of radiation tracer based on a correlation function that correlates the ratios of the spectra peaks for a respective region with percent weight of radiation tracer in the respective region. Determining distribution of radiation tracer in one or more regions can include determining distribution of radiation tracer in a borehole in which the tool is disposed or in a formation around the borehole in which the tool is disposed.

A system can comprise a tool having a detector to detect gamma rays, the tool operable downhole in a well; and a processor arranged to determine spectra peaks of the detected gamma rays in each of selected energy windows and to determine distribution of radiation tracer in one or more regions around the tool from ratios of the spectra peaks, the regions being between the tool and a source of the detected gamma rays when the tool operatively detects the gamma rays. Such a system can perform operations associated with method 700.

In various embodiments, a machine-readable storage device can comprise instructions stored thereon, which, when performed by a machine, cause the machine to perform operations, the operations comprising one or more features similar to or identical to features of methods and techniques described with respect to method 700, variations thereof, and/or features of other methods taught herein. The physical structures of such instructions may be operated on by one or more processors.

Executing these physical structures can cause the machine to perform operations, the operations comprising: detecting gamma rays in a detector in a tool, the tool disposed downhole in a well; determining spectra peaks of the detected gamma rays in each of selected energy windows; and determining distribution of radiation tracer in one or more regions around the tool from ratios of the spectra peaks, the regions being between the tool and a source of the detected gamma rays.

Executing the instructions can include a number of additional features. Determining spectra peaks of the detected gamma rays can include determining normalized spectra peaks of the detected gamma rays. Determining spectra peaks can include determining a Compton backscattering peak in a first energy window and a photopeak in a second energy window.

Determining distribution of radiation tracer in one or more regions can include determining the distribution of radiation tracer based on a correlation function that correlates the ratios of the spectra peaks for a respective region with percent weight of radiation tracer in the respective region. Determining distribution of radiation tracer in one or more regions can include determining distribution of radiation tracer in a borehole in which the tool is disposed or in a formation around the borehole in which the tool is disposed.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 830 of FIG. 8. While memory module 830 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 8:
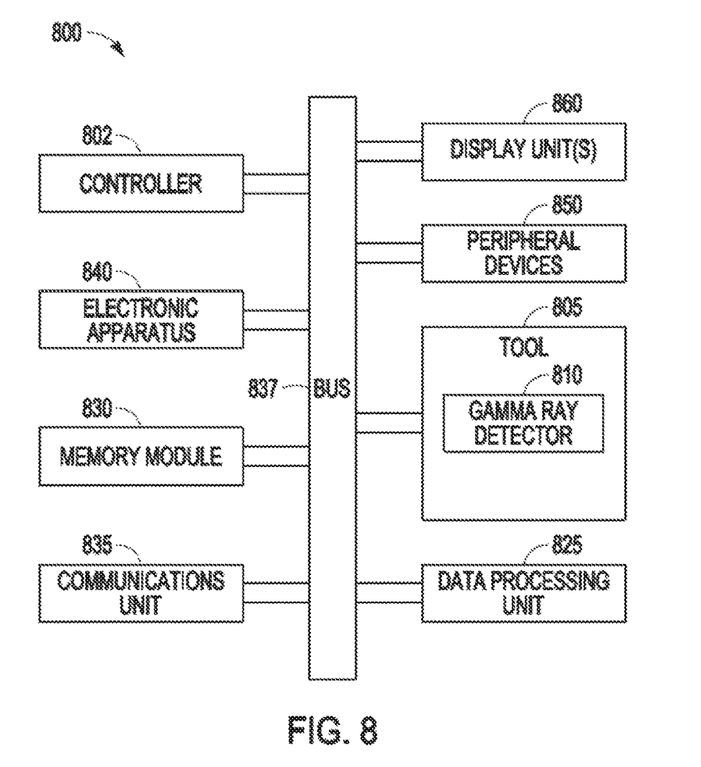
FIG. 8 is a block diagram of features of an example system operable with a detector package, in accordance with various embodiments.

FIG. 8 depicts a block diagram of an embodiment of features of an example system 800 operable with detection packages, as described herein or in a similar manner. The system 800 can include a tool 805 having a gamma ray detector 810 and a controller 802 that can be realized in a similar or identical manner to arrangements and processing discussed herein.

The system 800 can include a memory module 830, an electronic apparatus 840, and a communications unit 835. The memory module 830 can be structured to include a database. The controller 802, the memory module 830, and the communications unit 835 can be arranged to operate as a processing unit to control operation of the tool 805 and to perform operations on the signals collected by the gamma ray detector 810 to conduct evaluations of an entity under investigation. A data processing unit 825, structured to conduct evaluation of an entity under investigation using one or more detection packages, can be implemented as a single unit or distributed among the components of the system 800 including electronic apparatus 840. The electronic apparatus 840 can provide other circuitry for operation of the system 800. The controller 802 and the memory module 830 can operate to control use of the tool 805 and to manage processing schemes associated with detection signals provided from the gamma ray detector 810. The gamma ray detector 810 and the controller 802 can be configured, for example, to operate similar to or identical to the components discussed herein or similar to or identical to any of methods discussed herein.

The communications unit 835 may include downhole communications for appropriately located sensors in a drilling operation. Such downhole communications can include a telemetry system. The communications unit 835 may use combinations of wired communication technologies and wireless technologies at frequencies that do not interfere with on-going measurements.

The system 800 can also include a bus 837, where the bus 837 provides electrical conductivity among the components of the system 800. The bus 837 can include an address bus, a data bus, and a control bus, each independently configured or in an integrated format. The bus 837 can be realized using a number of different communication mediums that allows for the distribution of components of the system 800. The bus 837 can include a network. Use of the bus 837 can be regulated by the controller 802.

In various embodiments, the peripheral devices 850 can include additional storage memory and other control devices that may operate in conjunction with the controller 802 and the memory module 830. In an embodiment, the controller 802 can be realized as a processor or a group of processors that may operate independently depending on an assigned function.

The system 800 can include display unit(s) 860 as a distributed component that may be located remote from the entity under investigation using the tool 805, where the display unit(s) 860 can be used with instructions stored in the memory module 830 to implement a user interface to monitor the operation of the tool 805 or components distributed within the system 800. The user interface may be used to input parameter values for thresholds such that the system 800 can operate autonomously substantially without user intervention in a variety of applications. The user interface can also provide for manual override and change of control of the system 800 to a user. Such a user interface can be operated in conjunction with the communications unit 835 and the bus 837.

FIG. 9 depicts an example system 900 at a drilling site, where the system is operable with detection packages, as described herein or in a similar manner. The system 900 can include a tool 905-1, 905-2, or both 905-1 and 905-2 to conduct measurements and analysis using one or more detection packages as taught herein. Tools 905-1 and 905-2 can be realized in a similar or identical manner to arrangements taught herein.

System 900 can include a drilling rig 902 located at a surface 904 of a well 906 and a string of drill pipes, that is, drill string 929, connected together so as to form a drilling string that is lowered through a rotary table 907 into a wellbore or borehole 912-1. Drilling rig 902 can provide support for drill string 929. Drill string 929 can operate to penetrate rotary table 907 for drilling the borehole 912-1 through subsurface formations 914. Drill string 929 can include drill pipe 918 and a bottom hole assembly 920 located at the lower portion of drill pipe 918.

The bottom hole assembly 920 can include a drill collar 916 and a drill bit 926. Drill bit 926 can operate to create borehole 912-1 by penetrating the surface 904 and the subsurface formations 914. Bottom hole assembly 920 can include tool 905-1 attached to drill collar 916 to perform measurements to conduct formation and/or borehole evaluation. Tool 905-1 can be structured for an implementation in a measure-while-drilling (MWD) system such as a LWD system. The housing containing tool 905-1 can include electronics to control tool 905-1 and collect responses from a gamma ray detector(s) of tool 905-1. Such electronics may include a processing unit to provide analysis of the formation to the surface over a standard communication mechanism for operating in a well. Alternatively, electronics can include a communications interface to provide signals output by gamma ray detector(s) of tool 905-1 to the surface over a standard communication mechanism for operating in a well, where these output signals can be analyzed at a processing unit at the surface.

During drilling operations, drill string 929 can be rotated by rotary table 907. In addition to, or alternatively, the bottom hole assembly 920 can also be rotated by a motor (e.g., a mud motor) that is located downhole. Drill collars 916 can be used to add weight to drill bit 926. Drill collars 916 also can stiffen the bottom hole assembly 920 to allow the bottom hole assembly 920 to transfer the added weight to drill bit 926, and in turn, assist drill bit 926 in penetrating surface 904 and subsurface formations 914.

During drilling operations, a mud pump 932 can pump drilling fluid (sometimes known by those of skill in the art as "drilling mud") from a mud pit 934 through a hose 936 into drill pipe 918 and down to drill bit 926. The drilling fluid can flow out from drill bit 926 and be returned to the surface 904 through an annular area 940 between drill pipe 918 and the sides of the borehole 912-1. The drilling fluid may then be returned to mud pit 934, where such fluid is filtered. In some embodiments, the drilling fluid can be used to cool drill bit 926, as well as to provide lubrication for drill bit 926 during drilling operations. Additionally, the drilling fluid may be used to remove subsurface formation 914 cuttings created by operating drill bit 926.

In various embodiments, tool 905-2 may be included in a tool body 970 coupled to a logging cable 974 such as, for example, for wireline applications. The tool body 970 containing the tool 905-2 can include electronics to control tool 905-2 and collect responses from gamma ray detector(s) of tool 905-2. Such electronics can include a processing unit to provide analysis of the formation to the surface over a standard communication mechanism for operating in a well. Alternatively, electronics can include a communications interface to provide signals output by gamma ray detector(s) of tool 905-2 to the surface over a standard communication mechanism for operating in a well, where these output signals can be analyzed at a processing unit at the surface. The logging cable 974 may be realized as a wireline (multiple power and communication lines), a mono-cable (a single conductor), and/or a slick-line (no conductors for power or communications), or other appropriate structure such as coiled tubing, drill pipe, downhole tractor, or the like for use in the borehole 912-2. Though, for convenience, FIG. 9 depicts both an arrangement for wireline applications and an arrangement for LWD applications, the system 900 may be also realized for one of the two applications.

Techniques, as taught herein, employ a nuclear method and system, utilizing the ratio of Compton back scattering peak to photopeak to derive the distribution of radiation tracer. The ratio of the spectrum peaks in selected energy window carries information of the radiation tracer distribution and can be used to estimate its Wt. % in the borehole and formation. Systems and methods, as taught herein, are capable of predicting the in situ real time radiation tracer distribution in the borehole and formation during spectral gamma ray logging process, to provide useful information for environmental correction algorithm.

Use the ratio of Compton back scattering peak to photopeak to determine radiation tracer distribution can provide an important input to borehole correction. No extra detector and tool design to conventional sensing tools are required for methods and systems as taught herein. Regular natural gamma ray logging spectra can be used with methods and systems as taught herein to estimate radiation tracer distribution and can be used to provide useful information to develop environmental correction algorithm. In addition, methods and systems as taught herein may predict in situ real time radiation tracer distribution in the borehole and formation.

The following are example embodiments of methods, machine readable storage devices, and systems in accordance with the teachings herein.

A method 1 can comprise: detecting gamma rays in a detector in a tool, the tool disposed downhole in a well; determining spectra peaks of the detected gamma rays in each of selected energy windows; and determining, via a processor, distribution of radiation tracer in one or more regions around the tool from ratios of the spectra peaks, the regions being between the tool and a source of the detected gamma rays.

A method 2 can include elements of method 1 and can include determining spectra peaks of the detected gamma rays to include determining normalized spectra peaks of the detected gamma rays.

A method 3 can include elements of any of methods 1-2 and can include determining spectra peaks to include determining a Compton backscattering peak in a first energy window and a photopeak in a second energy window.

A method 4 can include elements of any of methods 1-3 and can include determining distribution of radiation tracer in one or more regions to include determining the distribution of radiation tracer based on a correlation function that correlates the ratios of the spectra peaks for a respective region with percent weight of radiation tracer in the respective region.

A method 5 can include elements of any of methods 1-4 and can include determining distribution of radiation tracer in one or more regions to include determining distribution of radiation tracer in a borehole in which the tool is disposed or in a formation around the borehole in which the tool is disposed.

A machine-readable storage device 1 having instructions stored thereon, which, when executed by a machine, cause the machine to perform operations, the operations comprising: detecting gamma rays in a detector in a tool, the tool disposed downhole in a well; determining spectra peaks of the detected gamma rays in each of selected energy windows; and determining distribution of radiation tracer in one or more regions around the tool from ratios of the spectra peaks, the regions being between the tool and a source of the detected gamma rays.

A machine-readable storage device 2 can include elements of machine-readable storage device 1 and can include determining spectra peaks of the detected gamma rays to include determining normalized spectra peaks of the detected gamma rays.

A machine-readable storage device 3 can include elements of any of machine-readable storage devices 1-2 and can include determining spectra peaks to include determining a Compton backscattering peak in a first energy window and a photopeak in a second energy window.

A machine-readable storage device 4 can include elements of any of machine-readable storage devices 1-3 and can include determining distribution of radiation tracer in one or more regions to include determining the distribution of radiation tracer based on a correlation function that correlates the ratios of the spectra peaks for a respective region with percent weight of radiation tracer in the respective region.

A machine-readable storage device 5 can include elements of any of machine-readable storage devices 1-4 and can include determining distribution of radiation tracer in one or more regions to include determining distribution of radiation tracer in a borehole in which the tool is disposed or in a formation around the borehole in which the tool is disposed.

A system 1 can comprise: a tool having a detector to detect gamma rays, the tool operable downhole in a well; and a processor arranged to determine spectra peaks of the detected gamma rays in each of selected energy windows and to determine distribution of radiation tracer in one or more regions around the tool from ratios of the spectra peaks, the regions being between the tool and a source of the detected gamma rays when the tool operatively detects the gamma rays.

A system 2 can include elements of system 1 and can include determination of the spectra peaks of the detected gamma rays to include determination of normalized spectra peaks of the detected gamma rays.

A system 3 can include elements of any of systems 1-2 and can include determination of the spectra peaks to include determination of a Compton backscattering peak in a first energy window and a photopeak in a second energy window.

A system 4 can include elements of any of systems 1-3 and can include determination of the distribution of radiation tracer in one or more regions to include determination of the distribution of radiation tracer based on a correlation function that correlates the ratios of the spectra peaks for a respective region with percent weight of radiation tracer in the respective region.

A system 5 can include elements of any of systems 1-4 and can include determination of the distribution of radiation tracer in one or more regions to include determination of the distribution of radiation tracer in a borehole in which the tool is disposed or in a formation around the borehole in which the tool is disposed.

A system 6 can include elements of any of systems 1-5 and can include the detector being a gamma ray scintillator coupled with a photomultiplier tube or a photodiode.

A system 7 can include elements of any of systems 1-6 and can include the detector being a semiconductor detector that converts photons incident to the semiconductor detector to an electrical signal.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   detecting gamma rays in a detector in a tool, the tool disposed downhole in a well;
   determining spectra peaks of the detected gamma rays in each of selected energy windows; and
   determining, via a processor, distribution of radiation tracer in one or more regions around the tool using a ratio of a Compton backscattering peak and a photopeak of the detected gamma rays, the regions being between the tool and a source of the detected gamma rays.

2. The method of claim 1, wherein determining spectra peaks of the detected gamma rays includes determining normalized spectra peaks of the detected gamma rays.

3. The method of claim 1, wherein determining spectra peaks includes determining a Compton backscattering peak in a first energy window and a photopeak in a second energy window.

4. The method of claim 1, wherein determining distribution of radiation tracer in one or more regions includes determining the distribution of radiation tracer based on a correlation function that correlates the ratios of the spectra peaks for a respective region with percent weight of radiation tracer in the respective region.

5. The method of claim 1, wherein determining distribution of radiation tracer in one or more regions includes determining distribution of radiation tracer in a borehole in which the tool is disposed or in a formation around the borehole in which the tool is disposed.

6. A system comprising:
   a tool having a detector to detect gamma rays, the tool operable downhole in a well; and
   a processor arranged to determine spectra peaks of the detected gamma rays in each of selected energy windows and to determine distribution of radiation tracer in one or more regions around the tool using a ratio of a Compton backscattering peak and a photopeak of the detected gamma rays, the regions being between the tool and a source of the detected gamma rays when the tool operatively detects the gamma rays.

7. The system of claim 6, wherein determination of the spectra peaks of the detected gamma rays includes determination of normalized spectra peaks of the detected gamma rays.

8. The system of claim 6, wherein determination of the spectra peaks includes determination of a Compton backscattering peak in a first energy window and a photopeak in a second energy window.

9. The system of claim 6, wherein determination of the distribution of radiation tracer in one or more regions includes determination of the distribution of radiation tracer based on a correlation function that correlates the ratios of the spectra peaks for a respective region with percent weight of radiation tracer in the respective region.

10. The system of claim 6, wherein determination of the distribution of radiation tracer in one or more regions includes determination of the distribution of radiation tracer in a borehole in which the tool is disposed or in a formation around the borehole in which the tool is disposed.

11. The system of claim 6, wherein the detector is a gamma ray scintillator coupled with a photomultiplier tube or a photodiode.

12. The system of claim 6, wherein the detector is a semiconductor detector that converts photons incident to the semiconductor detector to an electrical signal.

13. A machine-readable storage device having instructions stored thereon, which, when performed by a machine, cause the machine to perform operations, the operations comprising:
    detecting gamma rays in a detector in a tool, the tool disposed downhole in a well;
    determining spectra peaks of the detected gamma rays in each of selected energy windows; and
    determining distribution of radiation tracer in one or more regions around the tool using a ratio of a Compton backscattering peak and a photopeak of the detected gamma rays, the regions being between the tool and a source of the detected gamma rays.

14. A machine-readable storage device of claim 13, wherein determining spectra peaks of the detected gamma rays includes determining normalized spectra peaks of the detected gamma rays.

15. A machine-readable storage device of claim 13, wherein determining spectra peaks includes determining a Compton backscattering peak in a first energy window and a photopeak in a second energy window.

16. A machine-readable storage device of claim 13, wherein determining distribution of radiation tracer in one or more regions includes determining the distribution of radiation tracer based on a correlation function that correlates the ratios of the spectra peaks for a respective region with percent weight of radiation tracer in the respective region.

17. A machine-readable storage device of claim 13, wherein determining distribution of radiation tracer in one or more regions includes determining distribution of radiation tracer in a borehole in which the tool is disposed or in a formation around the borehole in which the tool is disposed.

\* \* \* \* \*